US011910198B2

(12) United States Patent
Grippo et al.

(10) Patent No.: US 11,910,198 B2
(45) Date of Patent: Feb. 20, 2024

(54) METHODS FOR CERTIFICATE ISSUANCE IN REMOTE PROVISIONING ARCHITECTURES FOR EMBEDDED UICCS

(71) Applicant: Tata Communications (America) Inc., Reston, VA (US)

(72) Inventors: Ron Grippo, Reston, VA (US); Luke Kiernan, West Windsor, NJ (US); William Buchanan, Reston, VA (US); Brian Peebles, Cranford, NJ (US)

(73) Assignee: Tata Communications (America) Inc., Reston, VA (US)

( * ) Notice: Subject to any disclaimer, the term of this patent is extended or adjusted under 35 U.S.C. 154(b) by 0 days.

(21) Appl. No.: 18/070,325

(22) Filed: Nov. 28, 2022

(65) Prior Publication Data
US 2023/0111144 A1   Apr. 13, 2023

Related U.S. Application Data

(62) Division of application No. 17/053,321, filed as application No. PCT/US2019/031110 on May 7, 2019, now Pat. No. 11,533,626.

(Continued)

(51) Int. Cl.
*H04W 12/72* (2021.01)
*H04W 12/37* (2021.01)
(Continued)

(52) U.S. Cl.
CPC .......... *H04W 12/72* (2021.01); *H04W 8/183* (2013.01); *H04W 12/041* (2021.01); *H04W 12/37* (2021.01); *H04W 60/00* (2013.01)

(58) Field of Classification Search
CPC ... H04W 12/72; H04W 8/183; H04W 12/041; H04W 12/37; H04W 60/00;
(Continued)

(56) References Cited

U.S. PATENT DOCUMENTS

2016/0080944 A1   3/2016  Colegate et al.
2017/0006466 A1   1/2017  Midkiff
(Continued)

OTHER PUBLICATIONS

Advisory Action (PTOL-303) dated Jun. 2, 2022 for U.S. Appl. No. 17/053,321.

(Continued)

*Primary Examiner* — Mazda Sabouri
(74) *Attorney, Agent, or Firm* — Kaplan Breyer Schwarz, LLP

(57) ABSTRACT

A system and method includes mobile device, a SIM associated with mobile device, an MNO computer, a computer associated with an owner of the mobile device, a first set of keys stored in the SIM for securely communicating with the MNO computer, and a second set of keys for securely communicating with the computer associated with the owner of the mobile device, to exchange application information. The SIM can be configured to determine when updated information related to the second set of keys is required, securely send a request to the MNO computer for updated information related to the second set of keys using the first set of keys, and responsively receive the updated information related to the second set of keys from the MNO computer, the updated information being provisioned by the computer associated with the owner of the mobile device. The mobile device is configured to utilize the updated information related to the second set of keys to establish data communication between an application running on the mobile device and the computer associated with the owner of the mobile device.

13 Claims, 3 Drawing Sheets

Related U.S. Application Data

(60) Provisional application No. 62/667,908, filed on May 7, 2018.

(51) Int. Cl.
   *H04W 12/041* (2021.01)
   *H04W 8/18* (2009.01)
   *H04W 60/00* (2009.01)

(58) Field of Classification Search
   CPC ....... H04W 12/069; H04W 4/50; H04W 4/60; H04W 12/04; H04W 12/40; H04L 9/3265; H04L 2209/805; H04L 9/14

See application file for complete search history.

(56) References Cited

U.S. PATENT DOCUMENTS

2017/0237561 A1  8/2017  Nix
2021/0076205 A1  3/2021  Grippo et al.

OTHER PUBLICATIONS

Authorized Officer: Shane Thomas, International Search Report and Written Opinion issued in counterpart PCT application No. PCT/US2019/031110, dated Sep. 3, 2019, 13 pp.
Examination report dated Dec. 10, 2021 in Indian Patent Application No. 202027051869.
Examiner Interview Summary Record (PTOL-413) dated Jun. 2, 2022 for U.S. Appl. No. 17/053,321.
Final Rejection dated Mar. 9, 2022 for U.S. Appl. No. 17/053,321.
Non-Final Rejection dated Dec. 3, 2021 for U.S. Appl. No. 17/053,321.
Notice of Allowance received for U.S. Appl. No. 17/053,321, dated Aug. 17, 2022, 7 pages.
Requirement for Restriction/Election dated Sep. 13, 2021 for U.S. Appl. No. 17/053,321.

METHODS FOR CERTIFICATE ISSUANCE IN REMOTE PROVISIONING ARCHITECTURES FOR EMBEDDED UICCS

CROSS REFERENCE TO RELATED APPLICATIONS

This application is a divisional of U.S. patent application Ser. No. 17/053,321, filed Nov. 5, 2020, which is a 371 of PCT/US2019/031110, filed May 7, 2019, which claims the benefit of U.S. Provisional Patent Application Ser. No. 62/667,908, filed May 7, 2018, entitled "Method for Certificate Issuance in Remote Provisioning Architectures for Embedded UICC," the entire disclosures of which are incorporated herein by reference.

FIELD

The present disclosure relates to wireless communications technology. More particularly, the present disclosure relates to methods and systems for remotely provisioning embedded Universal Integrated Circuit Cards.

BACKGROUND

The embedded Universal Integrated Circuit Card (eUICC) is an evolution of the Mobile SIM (Subscriber Identification Module) whereby the functionality is now a programmable capability permanently installed into the end user device at manufacturing time.

This capability allows a Mobile Network Operator (MNO), to modify, replace or remove profiles within the eUICC to tailor the connectivity of the device to the mobile network with which the device will communicate.

In the Mobile SIM, the MNO has the capability to install a "profile" of data and application functionality which enables the SIM to connect to a mobile network.

In the eUICC, the MNO can load multiple profiles into the device, to essentially create multiple 'personalities' for that device's mobile connectivity. Each profile would enable the device to connect to one or more mobile networks in a different way, which could change the policies, rates, and performance of the device.

The downloading, updating or deletion of these profiles is accomplished via an OTA (Over-The-Air) service and defined in the GSMA Specification SGP.02 v3.2 (27 Jun. 2017).

The High-level architecture for this system is provided in SGP.02 v3.2 and shown in FIG. 1.

In this depiction, the Certificate Issuer 102 represents a Certificate Authority which provides secure credentials used by MNO 104 to safely conduct the operations of intercommunication with eUICC 106.

The manufacturer 108 of the eUICC 106 and the MNO 104 must work together in order to put in place the necessary tools and credentials to establish secure communications and download (OTA) profiles or profile changes to the eUICC.

The two key components in this process are the:
1. Subscription Manager Data Preparation 110
2. Subscription Manager Secure Routing 112

These elements enable the storing, instructions and downloading of the profile or profile data files necessary to conduct Profile Management on the eUICC 106.

The details of this process are provided in SGP.02 v3.2 (27 Jun. 2017).

The specification SGP.02 v3.2 (27 Jun. 2017) covers in detail the process by which these functions are conducted. Each MNO would have its own capabilities to enable these functions in their network.

However, in the global scheme of Mobile Networking, there are a great many Virtual MNOs (MVNO) who use the capabilities of one or more MNOs. When operating in this manner, the MVNO will often encounter the need to perform interoperations across more than one MNO and their Profile Management capabilities. In fact, the MVNO will have their own profile which may need to exist in multiple SM-DP or vary from SM-DP to SM-DP.

There are also a large number of non-standard methods in existence which use a so-called "closed-loop" method of accomplishing the Profile Management.

These situations have given rise to a need by which different profiles from different mobile providers (MNO or MVNO) can be provisioned across multiple eUICC from different manufacturers (EUM) using different methods (standard and proprietary).

In the world of embedded devices, commercially known as Internet of Thing (IoT) devices, Enterprises seeking to deploy IOT assets using Mobile connectivity are often concerned about ownership of and access to security keys.

In the model defined by GSMA SG.02 v3.2 (27 Jun. 2017), it is generally a 'given' that the EUM owns and provides the initial keys which will establish the secure data sessions (via https) over which the IoT device eUICC will communicate. For some enterprises, this is problematic as it breaks their chain of 'trust.'

To work around this issue, some vendors are devising methods by which additional security credentials can be issued after the device is already provisioned in the field. However, these new methods still rely at least in part on the Mobile Network Operator (MNO) provider or the EUM to issue the security credentials.

SUMMARY

Disclosed herein is a system and method by which the chain of certificate ownership can be released to an external party, namely the Enterprise itself, thereby making the Enterprise the only trusted entity in the security credential ownership.

To accomplish this process, the method and system uses the original security credentials issued or provisioned to the UICC to enable ES8 interface communications (between the SM-DP and the UICC), to obtain new security credentials provisioned by the Enterprise and in a function which can perform auto-provisioning to the UICC upon first use or upon expiry of certificates.

In the method and system, the first set of security credentials are issued to direct the device to target the Enterprise security provisioning service whereupon new credentials are provided to shift the trusted domain over to the Enterprise itself. Upon shifting this trusted domain, yet additional security keys can be issued by the Enterprise (or it's trusted entity) to direct the device to the appropriate application destination, thereby completely obfuscating the communications path from the outside world.

Hence, in the method and system, security keys can be provisioned to a UICC or eUICC by an entity other than the MNO or a SIM provider. This enables an Enterprise to retain control over their own security provisioning without needing to include other parties into their trusted domain.

In some embodiments, the system comprises: a mobile device; a Subscriber Identity Module (SIM) associated with mobile device; a Mobile Network Operator (MNO) computer; a computer associated with an owner of the mobile device; a first set of keys stored in the SIM for securely communicating with the MNO computer; and a second set of keys for securely communicating with the computer associated with the owner of the mobile device, to exchange application information; wherein the SIM is configured to: 1) securely send a request to the MNO computer for updated information related to the second set of keys using the first set of keys; and 2) responsively receive the updated information related to the second set of keys from the MNO computer, the updated information being provisioned by the computer associated with the owner of the mobile device; and wherein the mobile device is configured to utilize the updated information related to the second set of keys to establish data communication between an application running on the mobile device and the computer associated with the owner of the mobile device.

In some embodiments of the above system and its various embodiments, the SIM is further configured to send an identification number for the SIM and an identification number for the mobile device to the MNO computer.

In some embodiments of the above the system and its various embodiments, the MNO computer is configured to record the identification number for the SIM and the identification number for the mobile device with the computer associated with the owner of the mobile device, to associate the SIM with the mobile device.

In some embodiments of the above the system and its various embodiments, the SIM is further configured to determine when updated information relating to the second set of keys is required.

In some embodiments of the above the system and its various embodiments, the system further comprising an external entity that determines when updated information relating to the second set of keys is required.

In some embodiments, the system comprises: a mobile device having a Subscriber Identity Module (SIM); a Mobile Network Operator (MNO) computer; a computer associated with an owner of the mobile device; wherein the SIM is configured, in response to a first use of the mobile device, to securely transmit to the MNO computer information associating the SIM with the mobile device to form an association therebetween; wherein the MNO computer is configured to record the information associating the SIM with the mobile device with the computer associated with the owner of the mobile device; and wherein the computer associated with the owner of the mobile device is configured to verify the association between the SIM and the mobile device before permitting certain attempted communications purportedly from the mobile device to the computer associated with the owner of the mobile device.

In some embodiments of the above system, the SIM is further configured to securely transmit the information associating the SIM with the mobile device using a first set of key provided with the SIM.

In some embodiments of the above system its various embodiments, the computer associated with the owner of the mobile device is further configured to send a second set of keys in response to receiving the information associating the SIM with the mobile device, the second set of keys enabling data communication between an application running on the mobile device and the computer associated with the owner of the mobile device.

In some embodiments of the above systems and their various embodiments, the owner of the mobile device is an Enterprise.

In some embodiments of the above the systems and their various embodiments, the information associating the SIM with the mobile device includes an identification number for the SIM and an identification number for the Mobile device.

In some embodiments of the above the systems and their various embodiments, the SIM comprises a Universal Integrated Circuit Card (UICC).

In some embodiments of the above the systems and their various embodiments, the UICC is embedded in circuitry of the mobile device.

In some embodiments of the above the systems and their various embodiments, the SIM comprises a Universal SIM.

In some embodiments, the method comprises: a) sending, with the SIM using a first set of security keys, a first message to a Mobile Network Operator (MNO) computer, the first message containing an identification number for the SIM and an identification number for the mobile device; b) reporting, with the MNO computer, the identification number for the SIM and the identification number of the mobile device to a computer associated with an owner of the mobile device; c) in response to receiving the identification number for the SIM and the identification number of the mobile device to a computer associated with an owner of the mobile device, provisioning, with the computer associated with the owner of the mobile device, a second set of security keys specific for an application running on the mobile device; d) sending, with the computer associated with the owner of the mobile device, a second message to the MNO computer, the second message containing the second set of security keys specific for an application running on the mobile device; e) sending, with the MNO computer using the first set of security keys, the second message with the second set of security keys specific for the application running on the mobile device; and f) establishing, with the application running on the mobile device, a secure communication line with the computer associated with the owner of the mobile device using the second set of keys.

In some embodiments of the method, the owner of the mobile device is an Enterprise.

In some embodiments of the method and its various embodiments, the SIM comprises a Universal Integrated Circuit Card (UICC).

In some embodiments of the method and its various embodiments, the UICC is embedded in circuitry of the mobile device.

In some embodiments of the method and its various embodiments, the SIM comprises a Universal SIM.

In some embodiments of the method and its various embodiments, prior to performing step a, activating the mobile device for a first time.

In some embodiments of the method and its various embodiments, steps a-e are repeated each time another set of security keys for establishing a secure communication line between the mobile device and the computer associated with the owner of the mobile device are required and wherein the first, the second, or another set of security keys can be used to securely send the message in step a containing the identification number for the SIM and the identification number for the mobile device.

BRIEF DESCRIPTION OF THE DRAWINGS

The disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and the drawing.

DETAILED DESCRIPTION

Figure 1:
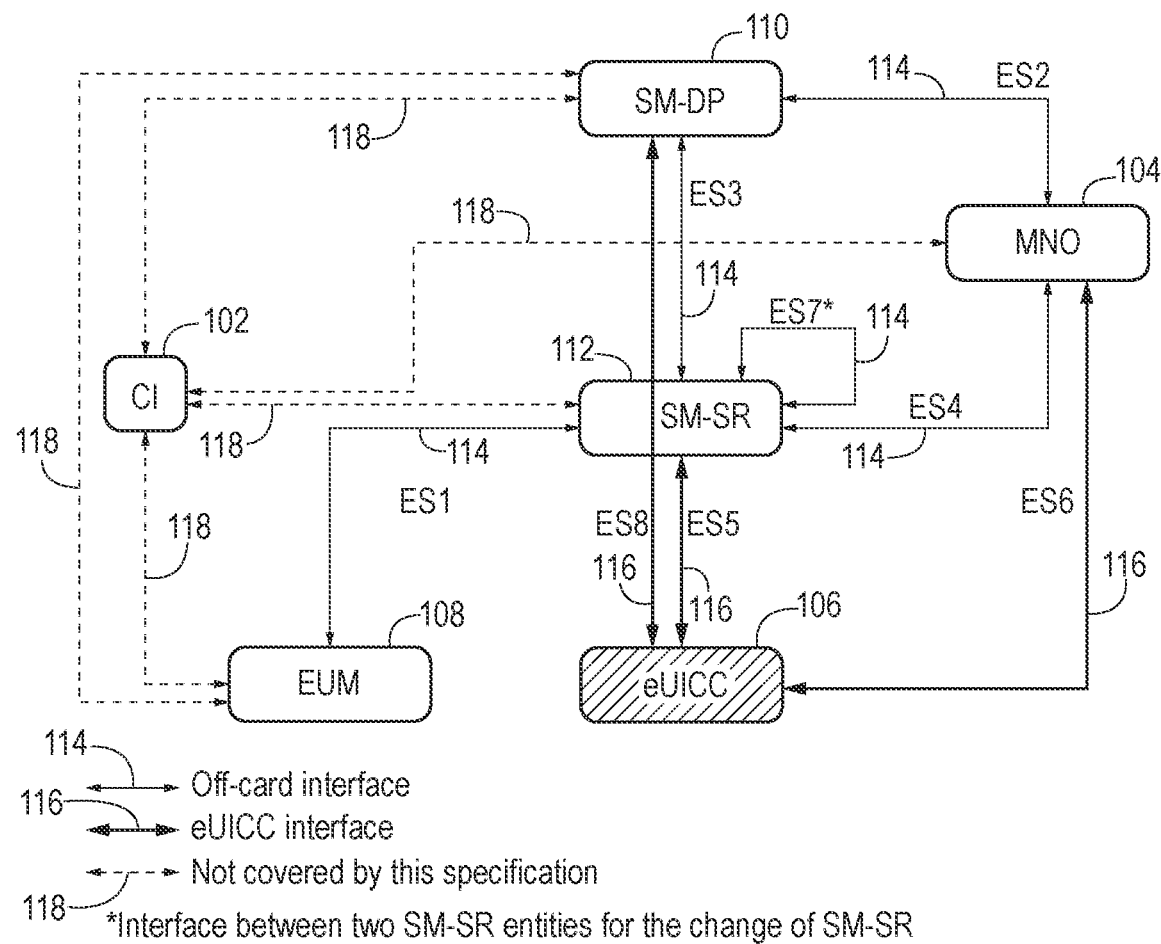
FIG. 1 is a diagram showing the High-level architecture for an OTA (Over-the-Air) service system provided in SGP.02 v3.2.

The following description merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

As mentioned earlier, security keys are provisioned by a SIM provider or mobile operating entity in modern SIM provisioning systems. This requires an Enterprise who is deploying devices in a mobile network to trust the SIM provider or Mobile Operating entity to provide the security keys to the device. By enabling the enterprise to own and operate their own provisioning functionality, they can avoid needing to add other entities into their trusted domain.

Large enterprises, who have accountability for the security of their devices, require a method by which they can provision these devices without depending on external parties.

Existing systems require the SIM Provider or Mobile Network Operator (MNO) to provide this service. This is the result of needing an initial certificate to be provided when the SIM is actually provisioned initially.

In accordance with the present disclosure, the initial security keys provided by the SIM manufacturer are used to establish a second set of security keys known only to and provided by the Enterprise using a method which enables external entities to provide these keys.

Figure 2:
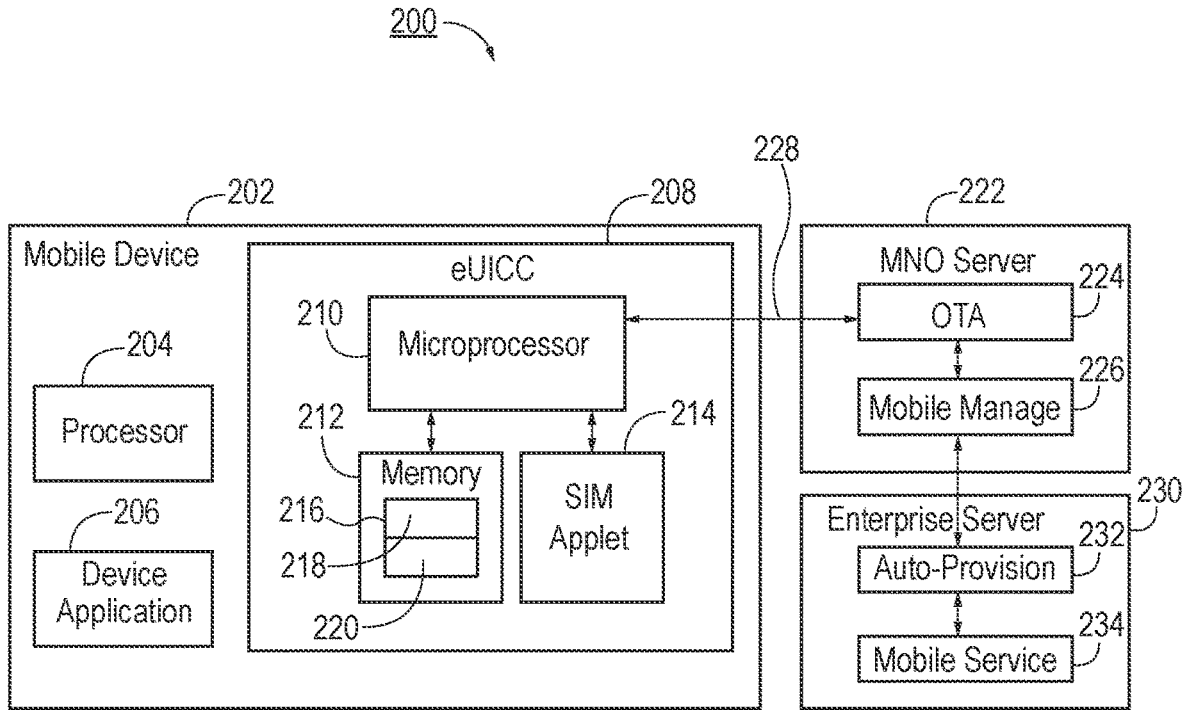
FIG. 2 is a block diagram of a provisioning system for embedded UICC according to an embodiment of the present disclosure, which allows an Enterprise to own and operate their own provisioning functionality.

Referring now to FIG. 2, there is shown a block diagram of a provisioning system for embedded UICC, according to an embodiment of the present disclosure, which allows an Enterprise to own and operate their own provisioning functionality. The system 200 generally includes a mobile device 202, an MNO server 222, and an Enterprise Server 230.

The mobile device 202 is managed and/or owned by an Enterprise and can be a smartphone, a laptop computer, a tablet computer, a Personal Digital Assistant, a sensor, Internet of Things (IoT) device, or any physical device or object that is configured to connect wirelessly to a network and has the ability to transmit data. The mobile device 202 includes one or more processors 204, a mobile device application 206, and an embedded Universal Integrated Circuit Card (eUICC) 208. The one or more processors are configured to execute the mobile device application 206. The mobile device application 206 is configured to be serviced by the Enterprise server 230. The eUICC 208 is provided by the MNO, and includes a microprocessor 210, a rewritable memory 212 and a SIM applet 214. The eUICC 208 is embedded directly into the circuitry of the mobile device 202. The memory 212 stores an MNO profile 216, which includes authentication data. The authentication data can include, without limitation, the Integrated Circuit Card Identifier (ICCID) number 218 of the eUICC 208 and encryption keys 220 (OTA keys). In some embodiments, the SIM applet 214 can be a Universal SIM (USIM) applet. The SIM applet 214 and the OTA keys 220 provide the mobile device 202 with secure access to over-the-air (OTA) and mobile management services provided by the MNO when the SIM 214 is executed by the microprocessor 210 of the eUICC 208. The rewritable memory 212 enables new and updated security keys provisioned to the SIM applet 214 by the Enterprise server 230, to be saved thereto.

In other embodiments, the mobile device can include removable Universal Integrated Circuit Card (UICC) or any other type of SIM card.

The MNO server 222 is operated by an MNO and can be comprised of one or more computing devices that are configured to provide an OTA function 224 and a mobile management function 226. The OTA function 224 of the MNO server 222 data communicates with the mobile management function 226 of the MNO server 222. The OTA function 224 enables the MNO to securely data communicate with the eUICC 208 of the mobile device 202 over an OTA network secure link 228 (RFM/RAM via HTTPS). The mobile management function 226 data communicates with an auto-provision function 232 of the Enterprise server 230.

The Enterprise server 230 is operated by the Enterprise or other entity, which owns and/or controls the eUICC 208 and/or mobile device 202, and can be comprised of one or more computing devices that are configured to provide the auto-provision function 232 and a mobile device service function 234. For example, the Enterprise server 230 can be comprised of one or more physical servers, a cloud computing infrastructure configured to implement functionality of the Enterprise server 230 and/or other server devices. In embodiments in which functionality of the Enterprise server 230 is provided by multiple physical computing devices, the computing devices can be co-located in a common location, or can be distributed across multiple physical locations and can communicate via a wide area network (WAN).

Figure 3:
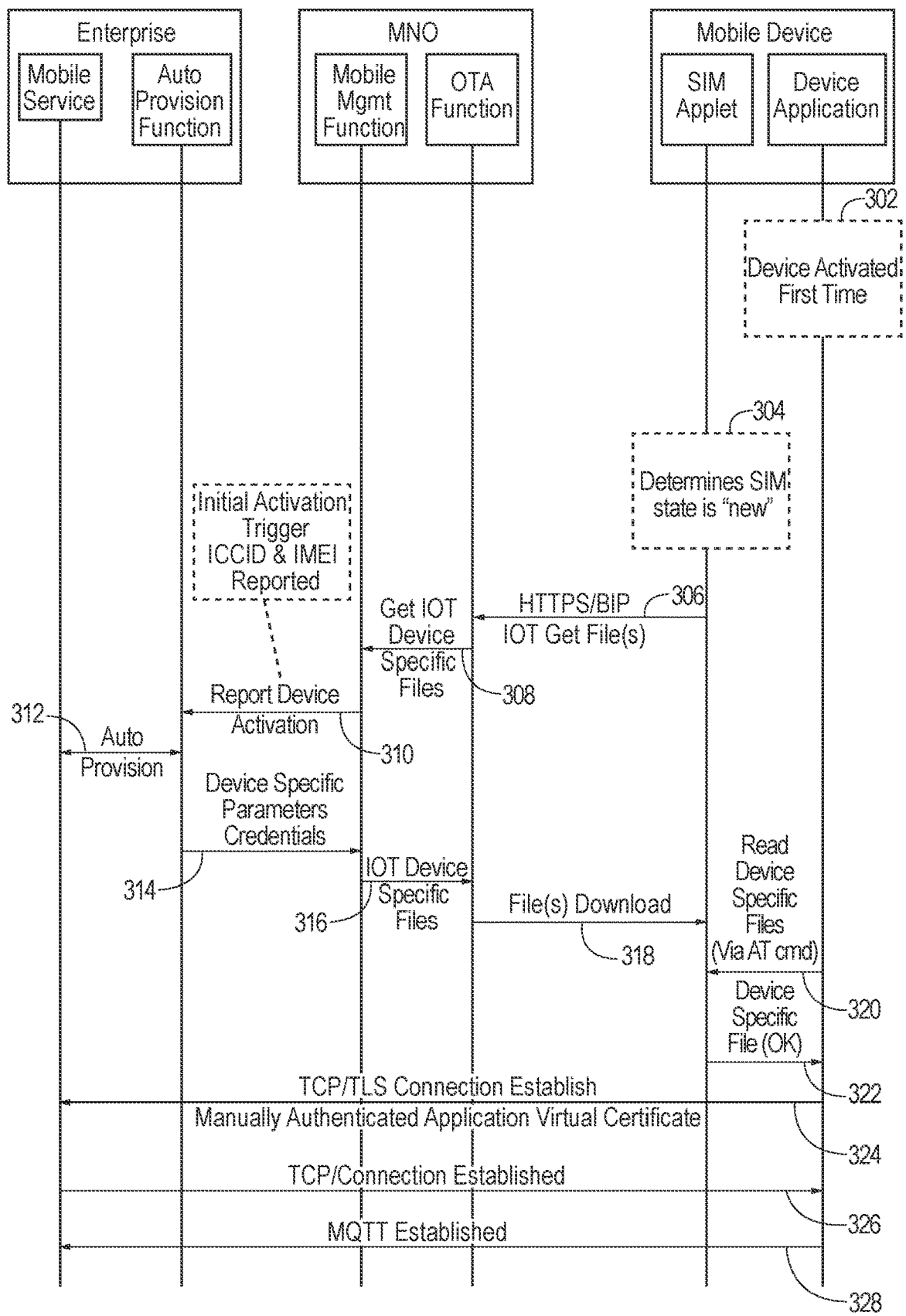
FIG. 3 is a message flow diagram depicting the steps of a method for provisioning security certificates according to an embodiment of the present disclosure.

Referring now to FIG. 3, there is shown a message flow diagram depicting the steps of a method 300 for provisioning security certificates according to an embodiment of the present disclosure. The method 300 can be implemented with a system that is the same as or similar to the system depicted in FIG. 2. At step 302, the mobile device is activated for the first time and connects to the MNO's mobile network. Once activated and connected to MNO mobile network, at step 304, the mobile device signals to the SIM applet that the mobile device is connected to the network and, in response, the SIM applet determines that the SIM state is "new."

Referring still to FIG. 3, at step 306, the SIM applet of the EUICC: 1) creates a message containing the ICCID number of the eUICC and the International Mobile Equipment Identity (IMEI) number of the mobile device; 2) establishes a secure OTA network link (HTTPS/BIP) with the OTA function of the MNO server using the OTA keys originally provided with the MNO profile saved on the eUICC; and 3) sends the message to the MNO server over the secure OTA network link. At step 308, the OTA function sends or transfers the message containing the ICCID and IMEI numbers to the mobile management function of the MNO server over the secure OTA network link. At step 310, the mobile management function of the MNO server reports the activation of the mobile device to the auto-provision function of the Enterprise server by reporting the ICCID and IMEI numbers contained in the message to the auto-provision function of the Enterprise server using, for example, a Web-based interface which can provides a HTTP connection between the mobile management function of the MNO and the auto-provision function of the Enterprise server. In response to the reporting of the ICCID and IMEI numbers, the auto-provision function then records the ICCID and IMEI numbers in a database and/or other data structure associated with the Enterprise server. The Enterprise uses the ICCID and IMEI numbers to associate the eUICC with the mobile device. That way the Enterprise will know if an attempt has been made to use the eUICC with another mobile device or if an attempt has been made to use the mobile device with another eUICC. In response to the receipt of the ICCID and IMEI numbers, at step 312, the auto-provision and mobile service functions automatically issue or provision a mobile device specific message, which includes device specific parameters and device specific security credentials. The device specific security credentials includes, without limitation, a set of security/encryption keys that will allow the mobile device application to establish a secure network connection with the mobile support service function of the Enterprise server to communicate over.

Referring still to FIG. 3, at step 314, the auto-provision function of the Enterprise server sends the device specific message containing the provisioned device specific parameters and security credentials to the mobile management function of the MNO server using the HTTP connection. At step 316, the mobile management function sends or transfers the device specific message containing the provisioned device specific parameters and security credentials to the OTA function of the MNO server over the secure OTA network link which was established in step 306 and remains open. At step 318, the OTA function of the MNO server downloads the provisioned device specific parameters and security credentials contained in the message to the SIM applet of the eUICC of the Mobile device over the secure OTA network link. At step 320, the mobile application reads the provisioned device specific parameters and security credentials downloaded to the SIM applet using an AT command. The provisioned device specific parameters and security credentials are then saved in the memory on the EUICC. At step 322, the SIM applet sends the provisioned device specific parameters and security credentials to the mobile device application running of the mobile device. At step 324, the mobile application running on the mobile device uses the security credentials (the set of security/encryption keys) to authenticate its identity with the mobile service function of the Enterprise server. At step 326, the mobile service function of the Enterprise server uses the security credentials to authenticate its identity with the mobile application running on the mobile device. At step 328, an Application specific protocol connection is established between the mobile application running of the mobile device and the mobile service function of the Enterprise, which enables the mobile application running on the mobile device and mobile function of the Enterprise Server to securely exchange data with one another.

Steps 306 to 322 of the method of FIG. 3 are performed by the system depicted in FIG. 2 or a similar system, when the current device specific parameters and security credentials (the set of security/encryption keys) need to be changed and/or updated. The need to update the device specific parameters and security credentials can be determined or triggered by the SIM applet or an entity external to the SIM applet including the auto-provision function of the Enterprise server or the device application of the mobile device.

It should be understood that the invention is not limited to the embodiments described herein and illustrated in the attached drawings. Rather, the appended claims should be construed broadly to include other variants and embodiments of the invention, which may be made by those skilled in the art without departing from the scope and range of equivalents of the invention. It is indeed intended that the scope of the invention should be determined by proper interpretation and construction of the appended claims and their legal equivalents, as understood by those of skill in the art relying upon the disclosure in this specification and the attached drawings.

What is claimed is:

1. A system comprising:
   a mobile device having a Subscriber Identity Module (SIM);
   a Mobile Network Operator (MNO) computer;
   a computer associated with an owner of the mobile device;
   wherein the SIM is configured, in response to a first use of the mobile device, to securely transmit to the MNO computer information associating the SIM with the mobile device to form an association therebetween;

wherein the MNO computer is configured to record the information associating the SIM with the mobile device with the computer associated with the owner of the mobile device;

wherein the computer associated with the owner of the mobile device is configured to verify the association between the SIM and the mobile device before permitting certain attempted communications purportedly from the mobile device to the computer associated with the owner of the mobile device;

wherein the SIM is further configured to securely transmit the information associating the SIM with the mobile device using a first set of keys provided with the SIM; and wherein the computer associated with the owner of the mobile device is further configured to send a second set of keys in response to receiving the information associating the SIM with the mobile device, the second set of keys enabling data communication between an application running on the mobile device and the computer associated with the owner of the mobile device.

2. The system of claim 1, wherein the information associating the SIM with the mobile device includes an identification number for the SIM and an identification number for the mobile device.

3. The system of claim 1, wherein the SIM comprises a Universal Integrated Circuit Card (UICC).

4. The system of claim 3, wherein the UICC is embedded in circuitry of the mobile device.

5. The system of claim 1, wherein the SIM comprises a Universal SIM.

6. The system of claim 1, wherein the owner of the mobile device is an Enterprise.

7. A method for enabling an owner of a mobile device to remotely provision a Subscriber Identity Module (SIM) of the mobile device, the method comprising:

a) sending, with the SIM using a first set of security keys, a first message to a Mobile Network Operator (MNO) computer, the message containing an identification number for the SIM and an identification number for the mobile device;

b) reporting, with the MNO computer, the identification number for the SIM and the identification number of the mobile device to a computer associated with an owner of the mobile device;

c) in response to receiving the identification number for the SIM and the identification number of the mobile device to a computer associated with an owner of the mobile device, provisioning, with the computer associated with the owner of the mobile device, a second set of security keys specific for an application running on the mobile device;

d) sending, with the computer associated with the owner of the mobile device, a second message to the MNO computer, the second message containing the second set of security keys specific for an application running on the mobile device;

e) sending, with the MNO computer using the first set of security keys, the second message with the second set of security keys specific for the application running on the mobile device; and f) establishing, with the application running on the mobile device, a secure communication line with the computer associated with the owner of the mobile device using the second set of keys.

8. The method of claim 7, wherein the owner of the mobile device is an Enterprise.

9. The method of claim 7, wherein the SIM comprises a Universal Integrated Circuit Card (UICC).

10. The method of claim 9, wherein the UICC is embedded in circuitry of the mobile device.

11. The method of claim 7, wherein the SIM comprises a Universal SIM.

12. The method of claim 7, wherein prior to performing step a, activating the mobile device for a first time.

13. The method of claim 7, wherein steps a-e are repeated each time another set of security keys for establishing a secure communication line between the mobile device and the computer associated with the owner of the mobile device are required and wherein the first, the second, or another set of security keys can be used to securely send the message in step a containing the identification number for the SIM and the identification number for the mobile device.

* * * * *